(12) United States Patent
Jarecki et al.

(10) Patent No.: US 12,173,832 B2
(45) Date of Patent: Dec. 24, 2024

(54) CLAMP INSULATION SYSTEMS AND METHODS

(71) Applicant: Lincoln Industries, Inc., Lincoln, NE (US)

(72) Inventors: John Michael Jarecki, Lincoln, NE (US); Adam James Matzner, Lincoln, NE (US)

(73) Assignee: Lincoln Industries, Inc., Lincoln, NE (US)

( * ) Notice: Subject to any disclaimer, the term of this patent is extended or adjusted under 35 U.S.C. 154(b) by 175 days.

(21) Appl. No.: 17/742,661

(22) Filed: May 12, 2022

(65) Prior Publication Data

US 2022/0364673 A1    Nov. 17, 2022

Related U.S. Application Data

(60) Provisional application No. 63/188,316, filed on May 13, 2021.

(51) Int. Cl.
| | | |
|---|---|---|
| *F16L 59/02* | (2006.01) | |
| *F16L 23/08* | (2006.01) | |
| *F16L 59/08* | (2006.01) | |
| *F16L 59/18* | (2006.01) | |

(52) U.S. Cl.
CPC ............. *F16L 59/028* (2013.01); *F16L 23/08* (2013.01); *F16L 59/08* (2013.01); *F16L 59/184* (2013.01)

(58) Field of Classification Search
CPC ......... F16L 59/18; F16L 59/184; F16L 59/08; F16L 23/08
See application file for complete search history.

(56) References Cited

U.S. PATENT DOCUMENTS

| | | | |
|---|---|---|---|
| 10,612,705 | B2 | 4/2020 | Prevot et al. |
| 2018/0224054 | A1* | 8/2018 | Donnelly ............... F16L 59/184 |
| 2019/0264846 | A1* | 8/2019 | Hoppe ................... F16L 59/184 |
| 2019/0353080 | A1* | 11/2019 | Brown ................... F16L 59/184 |
| 2020/0278070 | A1* | 9/2020 | Webster .................. F16L 59/18 |
| 2021/0317935 | A1* | 10/2021 | Ghirardi ................. F16L 23/08 |

FOREIGN PATENT DOCUMENTS

| | | |
|---|---|---|
| EP | 1912008 | 4/2008 |
| EP | 2058575 | 5/2009 |
| EP | 2913575 | 9/2015 |
| EP | 4089307 B1 | 3/2024 |
| WO | WO-2021076774 A1 * | 4/2021 |

OTHER PUBLICATIONS

"European Application Serial No. 22173386.8, Extended European Search Report mailed Sep. 21, 2022", 6 pgs.

* cited by examiner

*Primary Examiner* — Zachary T Dragicevich
(74) *Attorney, Agent, or Firm* — Schwegman Lundberg & Woessner, P.A.

(57) ABSTRACT

Clamp insulation systems and methods are disclosed. An example clamp system includes a foil cover having a top surface with a support structure, side walls and tapered end walls. The foil cover can define a pocket between the top surface, side walls and end walls. The insulation system further includes an insulation layer disposed in the pocket between the sidewalls and adjacent an inside of the top surface. The side walls can have a depth so that the pocket is capable of receiving a band of a clamp and so that the side walls are capable of being crimped about the band of the clamp.

12 Claims, 11 Drawing Sheets

CLAMP INSULATION SYSTEMS AND METHODS

CLAIM OF PRIORITY

This patent application claims the benefit of priority, under 35 U.S.C. Section 119(e), to John Michael Jarecki U.S. Patent Application Ser. No. 63/188,316, entitled "CLAMP INSULATION SYSTEMS AND METHODS," filed on May 13, 2021, which is hereby incorporated by reference herein in its entirety.

TECHNICAL FIELD

Various embodiments described herein generally relate to clamp insulation systems. One specific example includes insulation systems for V-band clamps used on exhaust systems.

BACKGROUND

Clamps are used across a wide variety of industries to connect tubing and ducting. Many clamp applications involve high temperature environments. For example, clamps used on exhaust systems (e.g., exhaust systems on cars, motorcycles, etc.) are subject to extreme temperatures. Improved clamp insulation systems are desired.

DETAILED DESCRIPTION

In the following detailed description of the invention, reference is made to the accompanying drawings that form a part hereof and in which are shown, by way of illustration, specific embodiments in which the invention may be practiced. These embodiments are described in sufficient detail to enable those skilled in the art to practice the invention. Other embodiments may be utilized and structural, logical, and electrical changes may be made.

The present disclosure provides various clamp insulation systems that can insulate all or a portion of a clamp. Prior attempts to insulate clamps have been found to poorly insulate, to be expensive, to be difficult or time consuming to assemble onto a clamp, and/or to be subject to mechanical or thermal failure. The clamp insulation systems and methods described herein can address these shortcomings and/or provide additional advantages. The disclosed clamp insulation systems can be efficiently made and assembled on a clamp, can maintain structural integrity in the presence of adverse environmental conditions (e.g., high temperatures), and can maintain structural integrity over time as a clamp is opened and closed (e.g., the insulation systems can move or flex with the clamp). When used with engine exhaust systems, the clamp insulation systems can shield sensitive components near the exhaust system/clamp from heat and/or can help retain heat in the exhaust system and improve system performance. These and other features of the disclosed clamp insulation systems can provide low cost, long life clamp insulation systems that provide a high degree of insulation.

An example of clamp insulation system prior to being assembled on a clamp includes a foil cover having a top surface with an optional support structure, side walls and end walls. The foil cover defines a pocket between the top surface and side walls for receiving an insulation layer and the clamp. The insulation layer is disposed in the pocket between the sidewalls and adjacent an inside of the top surface. As will be discussed further below, the side walls have a depth so that the pocket is capable of receiving a band of a clamp and so that the side walls can be secured to (e.g., crimped about) the band. The end walls extend from the top surface and can be welded to the top surface of the band using, e.g., a resistance weld, to seal of the ends of the clamp insulation system.

Figure 1:
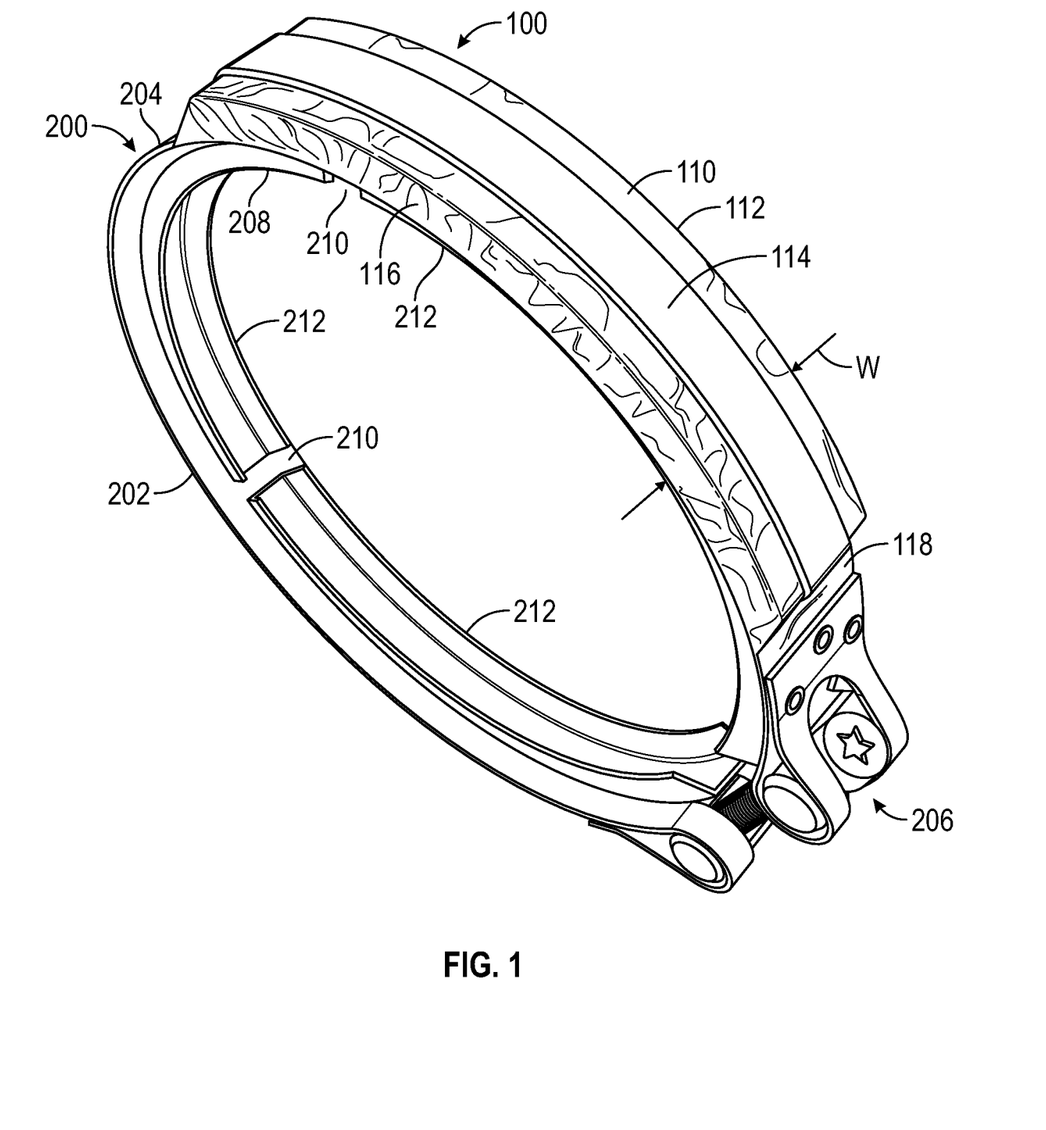
FIG. 1 shows a perspective view of a clamp with a clamp insulation system according to an embodiment of the invention.
Figure 2:
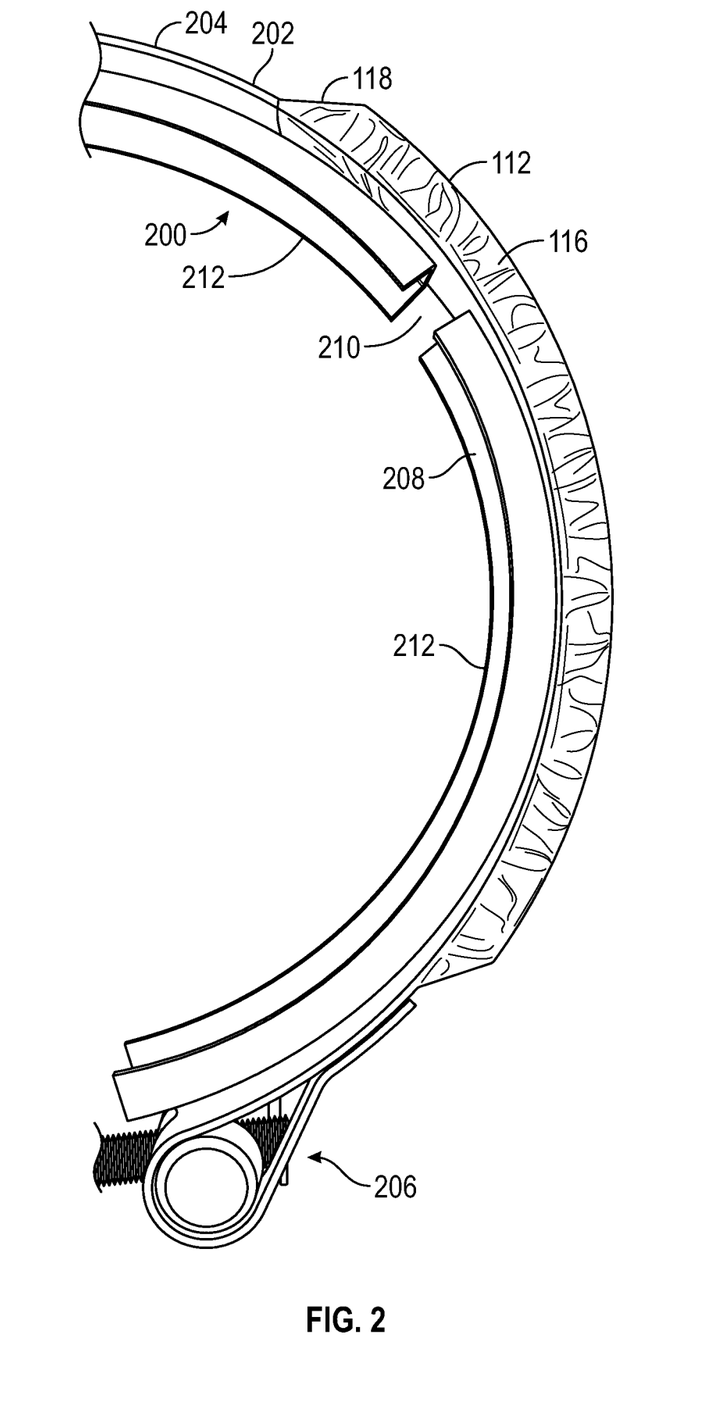
FIG. 2 shows a side view of the clamp and insulation system of FIG. 1.
Figure 3:
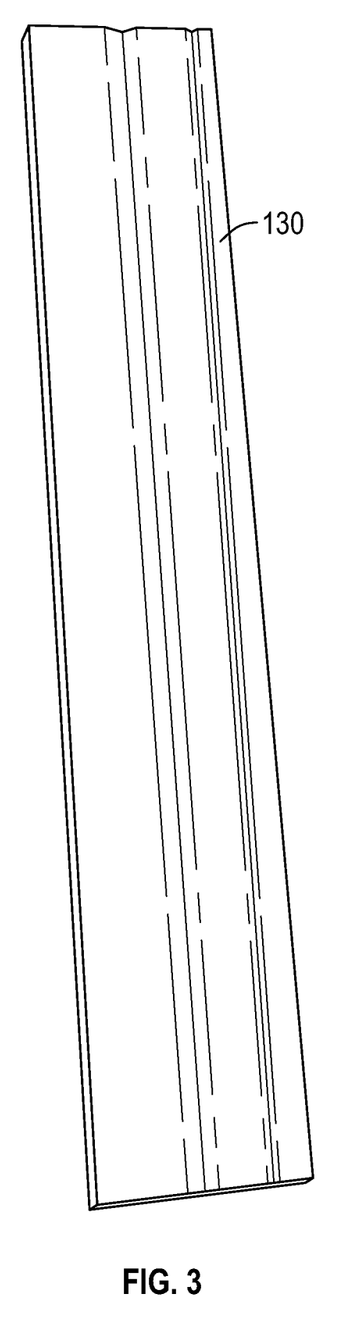
FIG. 3 shows an insulation layer according to an embodiment of the invention.

FIGS. 1-3 illustrate an example of a clamp insulation system 100 assembled on a V-band clamp 200. The clamp 200 includes a band 202 with a top surface 204, a coupling arrangement 206 mounted on the band 202, a retainer 208 between under the band 202. The clamp 200 (e.g., retainer 208) can include multiple segments 212 with gaps 210 between the segments 212. While a V-band clamp 200 is illustrated in the various examples disclosed herein, it should be appreciated that the clamp insulation systems can be used with a wide variety of clamps. The term clamp broadly covers clamps, couplers, retainers and other coupling arrangements, including V-band clamps and V-band retainers as examples.

The clamp insulation system 100 includes an insulation layer 130 (see FIG. 3) disposed in the pocket (not shown) of a foil cover 110 and adjacent the top surface 204 of the clamp band 202. The insulation layer 130 can, for example, be a fiber mat or high temperature insulation blanket. The insulation layer can be made from ceramic, fiberglass, felt or papers as examples. Example insulating layers include AES (alkaline earth silicate) fiber insulation such as Superwool® fiber from Morgan Thermal Ceramics and MAFTEC blanket fiber. In other examples, the insulating layer can be include multiple layers made from one or more different materials. The thickness of the insulation layer can, for example, range from ¼ inches to 1 inch. In some embodiments, the thickness may be ⅛ to ⅜ inches. In the illustrated example, the thickness is about ¼ inches. The foil cover can have a width about the same width of the clamp band. The width of the insulation layer is about the same as the width of the clamp band.

The foil cover 110 has top surface 112 and side walls 116 which extending over and around the insulation layer and which are secured to the clamp band 202. The foil cover 110 further includes ends 118 which taper to a welded connection with the clamp band 202. The foil cover 110 can be made from stainless steel such as 300, 302 or 304 series stainless steel and can have a thickness ranging from 0.003 inches to 0.010 inches. In some embodiments, the thickness can range from 0.005 inches to 0.008 inches as examples. In the illustrated embodiment, the foil cover 110 has a thickness of 0.008 inches. These thicknesses can impart advantageous structural properties to the foil cover including, e.g., the ability for the foil cover to retain a crimp against the band of the clamp, flex with movement of the clamp, and provide durability, for example. The width W of the foil cover 110 (e.g., width of the top surface) can be about the same as the width of the clamp band 202.

The foil cover 110 can be stamped from a rectangular sheet of foil into the desired shape. The foil cover 110 can further include a support structure such as a rib 114 on its top surface 112 such as a rib 114 centered between outer edges of foil cover and extending over all or a portion of the top surface 112 between or into the ends 118 of the foil cover 110. The support structure (e.g., rib 114) can be integrally formed as part of the top surface 112 during stamping of the foil. In the present disclosure, the term "foil" is used to describe any metal covering with a thickness in a range to provide desired properties, including, but not limited to, sufficient flexibility to fold, or otherwise conform to an arcuate shape of a band, and sufficient thickness to impart structural durability. An optimal thickness may vary with a chosen clamp size and desired insulative properties.

The foil cover 110 includes side walls 116 extending over the insulation layer and secured to the clamp 200. In the illustrated design, the side walls 116 are crimped around band 202 to secure the foil cover 112 and underlying insulation layer 130 to the clamp 200. The ends 118 of the foil cover 110 can also be crimped around the band 202 and welded to the top surface 204 of the band to provide a seal. Crimping provides a highly efficient way of assembling the insulation system to the clamp, allowing the foil cover 110 to conform to the shape of the clamp 200 while providing a secure mounting.

Figure 4:
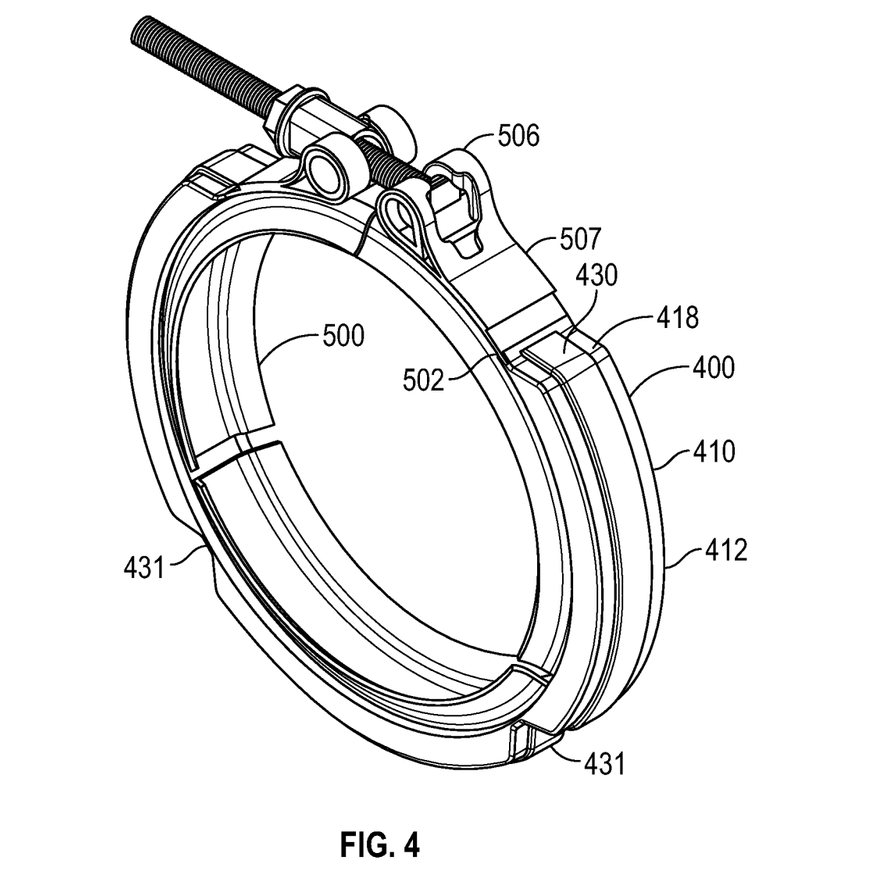
FIG. 4 shows a perspective view of a clamp and clamp insulation system according to an embodiment of the invention.
Figure 5:
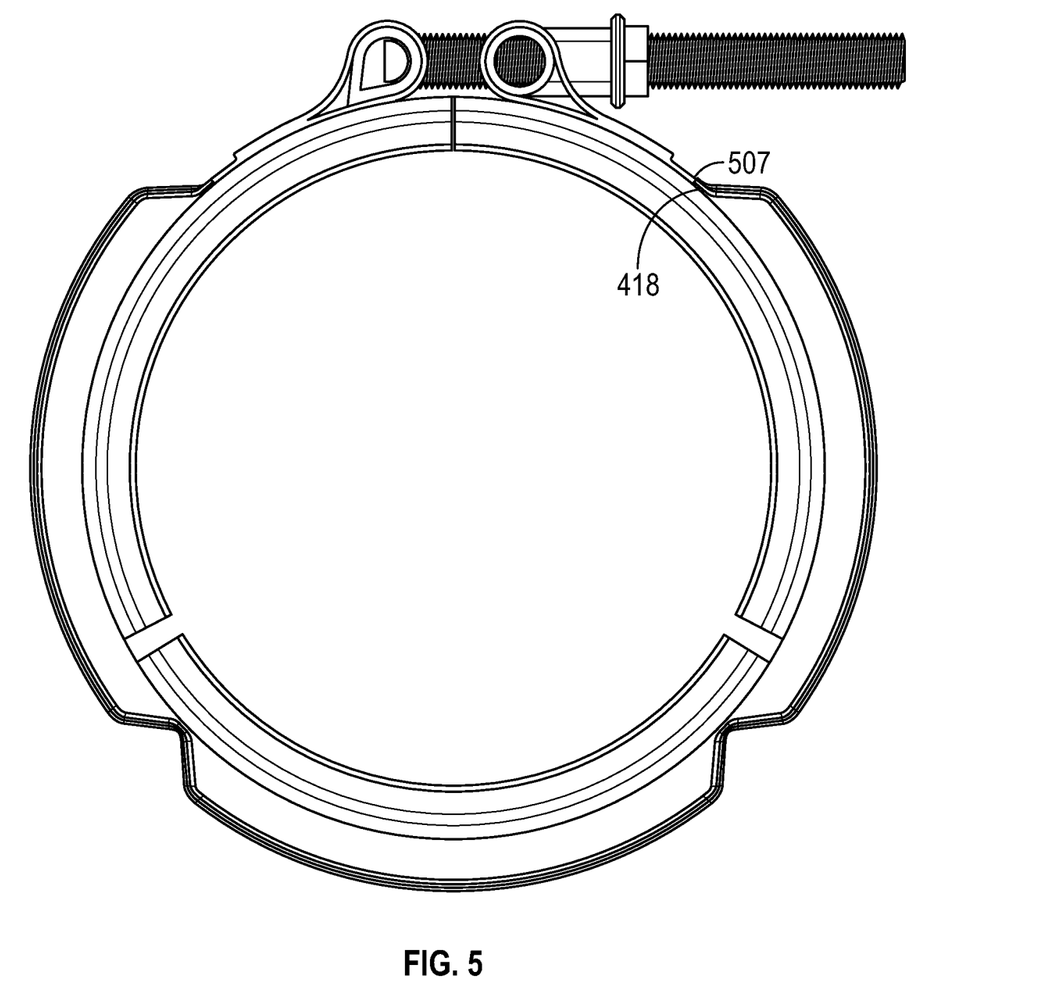
FIG. 5 shows a side view of the clamp and insulation system of FIG. 4.
Figure 6:
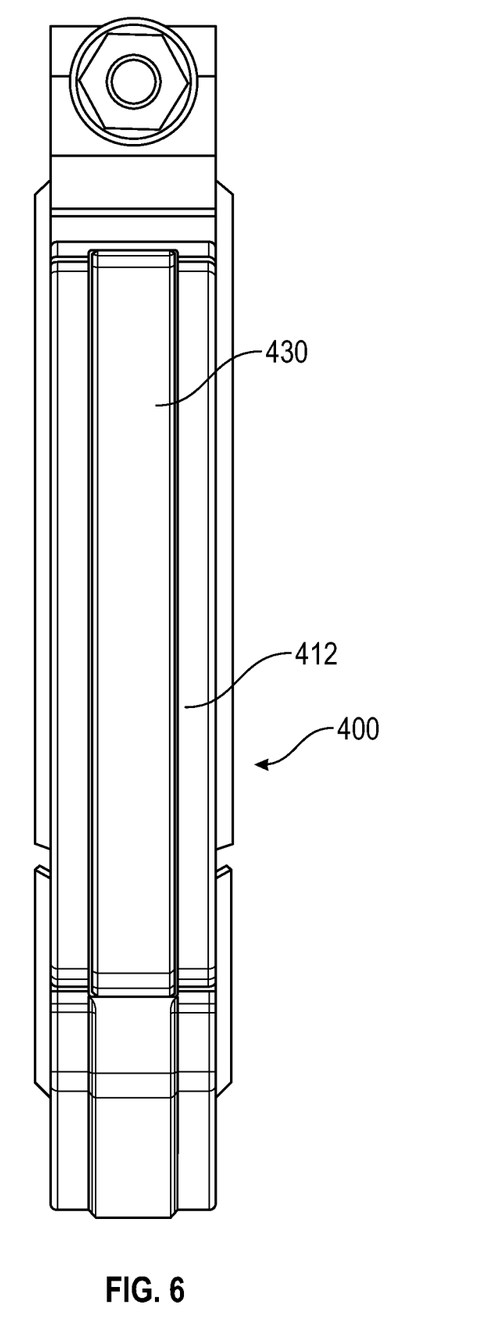
FIG. 6 shows an end view of the clamp and insulation system of FIG. 4.

FIGS. 4-6 illustrate an example of another clamp insulation system 400 assembled on a V-band clamp 500 where the insulation system 400 is disposed over substantially all of the band 502 of the clamp 500. The clamp insulation system 400 can have the same or similar properties of the clamp insulation systems described with regard to FIGS. 1-3 though with a longer length relative to the clamp. For example, the ends 418 of the foil cover 410 can taper to a location near or abutting (e.g., as shown in FIG. 5) a foot 507 of the coupling arrangement 506. In other examples, the foil cover and optionally the insulating layer can extend over a foot of the coupling arrangement. In yet other examples, the insulating system can be spaced apart from the coupling arrangement. See FIGS. 7 and 8, for example. The support structure of any of the clamp insulation systems discussed herein can extend over all or part of the top surface of a foil cover and can optionally extend across the ends of the foil cover. A design with a support rib 430 extending across the top surface 412 and the ends 418 of a cover is best shown in FIG. 4.

Figure 7:
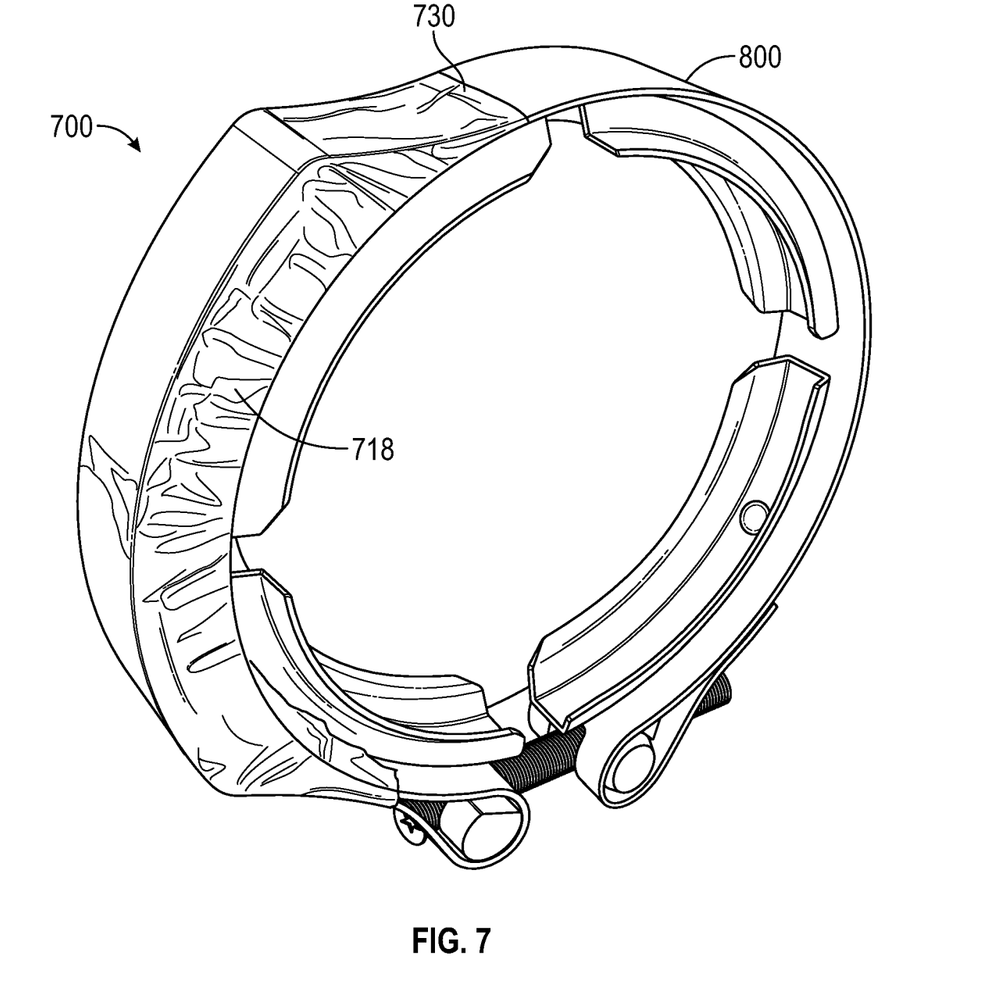
FIG. 7 shows a perspective view of a clamp and clamp insulation system according to an embodiment of the invention.
Figure 8:
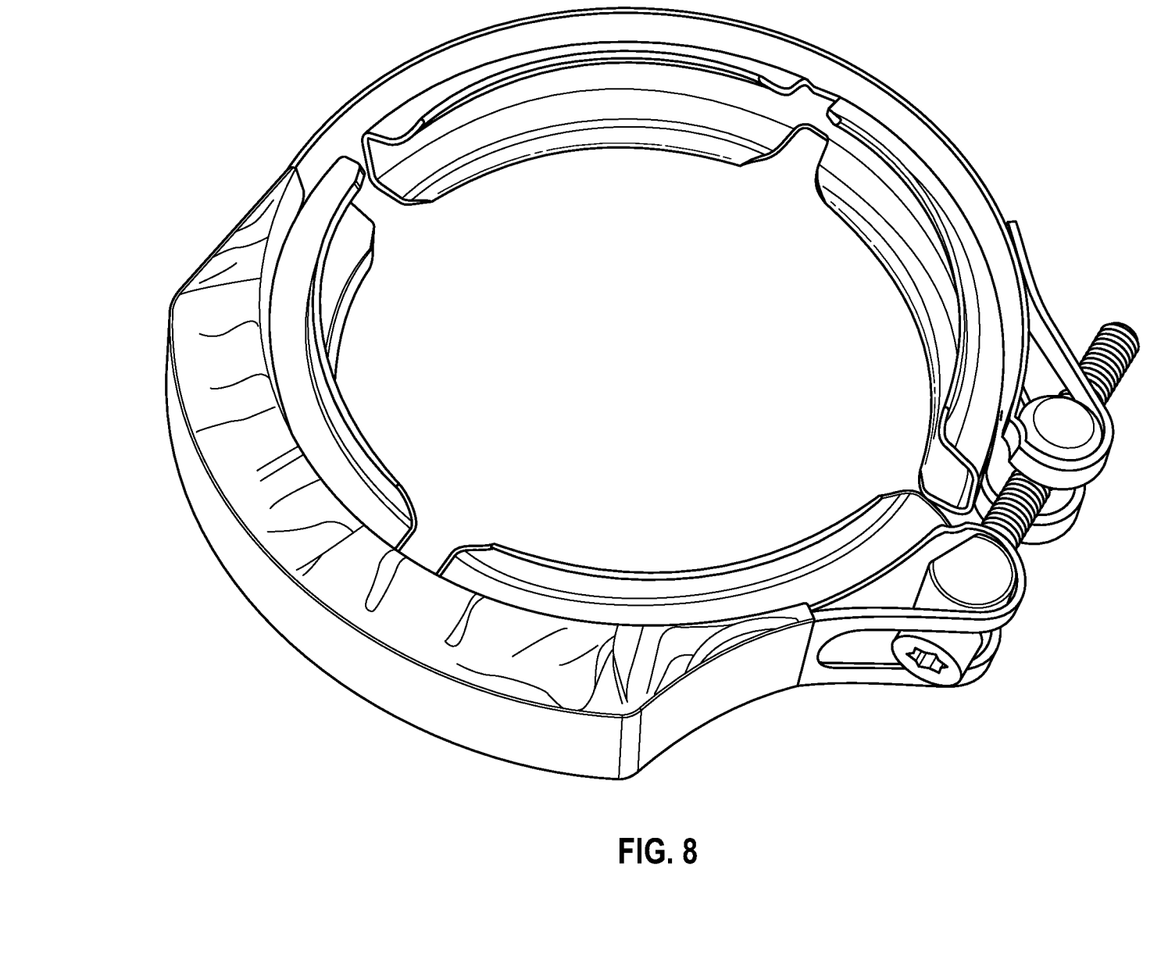
FIG. 8 shows another perspective view of the clamp and clamp insulation system of FIG. 7.

FIGS. 7-8 illustrate an example of another clamp insulation system 700 assembled on a V-band clamp 800 where the insulation system 700 has longer side walls 718 to accommodate thicker insulation layer. The clamp insulation system 700 can have the same or similar properties of the clamp insulation systems described above though with longer side walls 718 to form a deeper pocket within which to hold the insulation layer, relative to the clamp insulation systems discussed earlier. The system 700 is shown without a support structure on its top surface though a support structure (e.g., a rib) can be provided. The system 700 also best illustrates a resistance weld 730 that can be applied to a clamp insulation system to weld its foil cover ends to the top surface of an outer clamp band.

Figure 9:
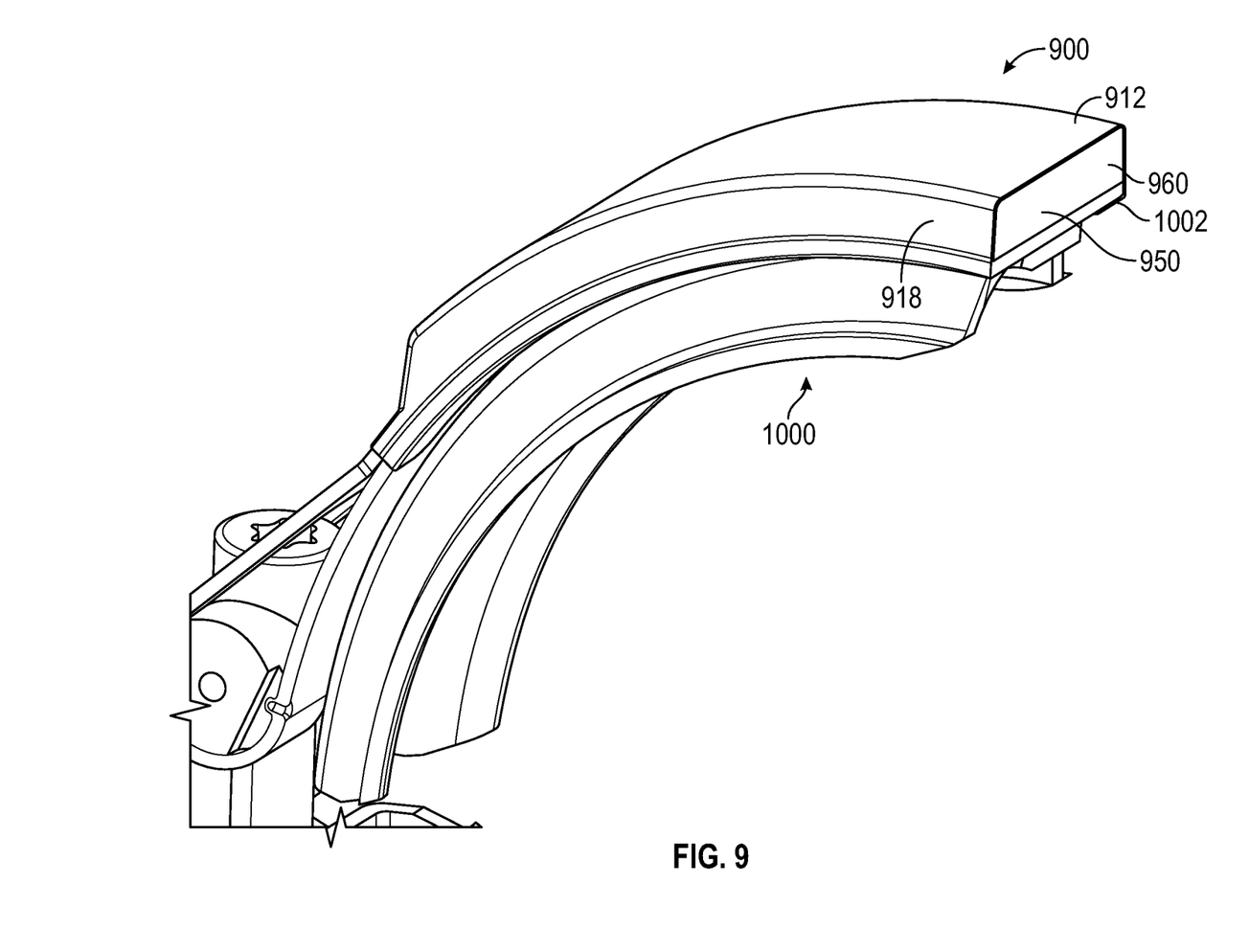
FIG. 9 shows a partial cut-away view of a clamp and clamp insulation system according to an embodiment of the invention.
Figure 10:
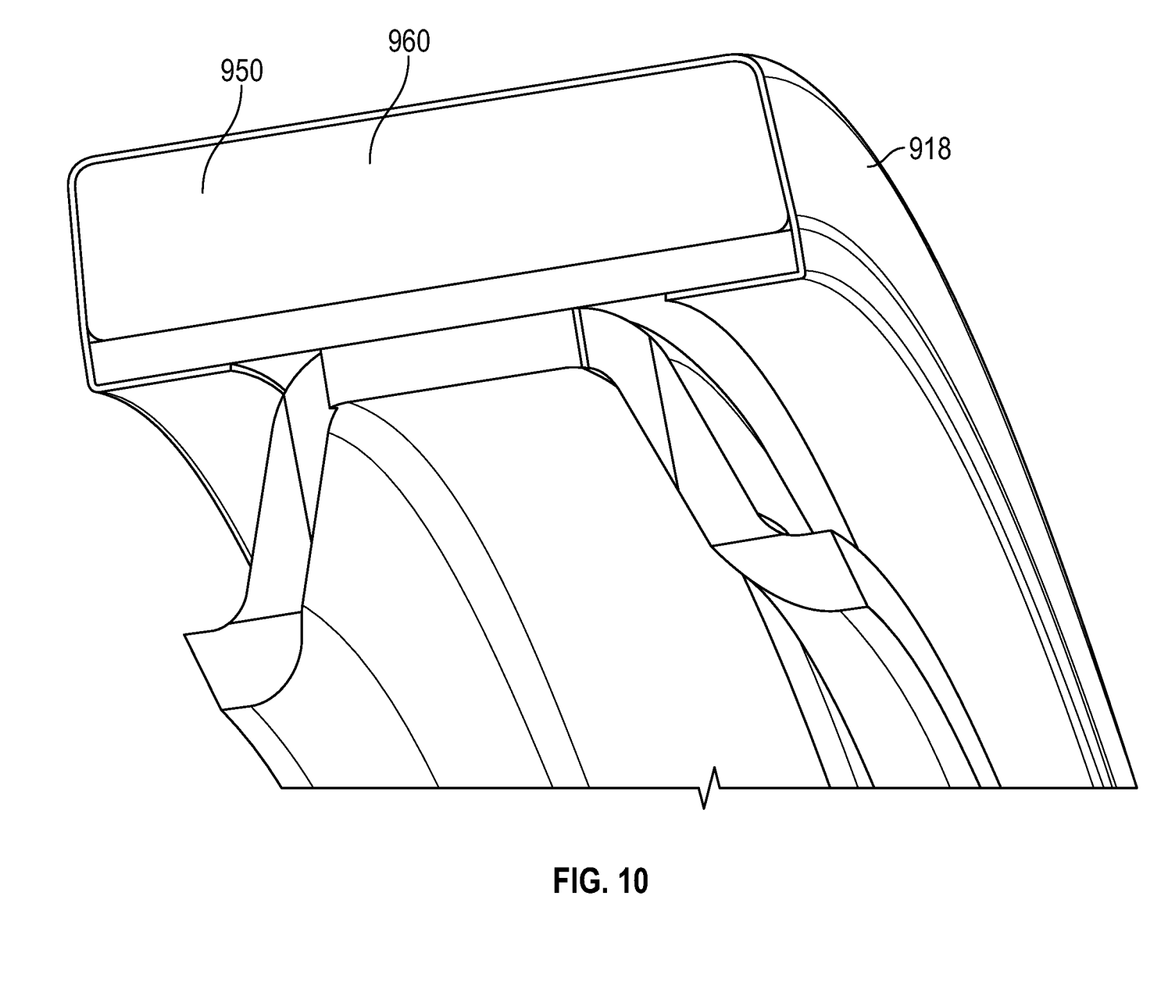
FIG. 10 shows another partial cut-away view of the clamp and clamp insulation system of FIG. 9.

FIGS. 9 and 10 illustrate an example of another clamp insulation system 900 assembled on a clamp 1000. These figures show an insulating layer 950 disposed in a pocket 960 formed between side walls 918 and the top surface 912 of the clamp insulation system 900. The insulating layer is disposed on top of the top surface 1002 of the clamp band 1000.

In the illustrated designs, the insulation system extends over about ⅓ of the clamp and crosses portions of adjacent segments of the clamp (FIGS. 1-2) or substantially all of the clamp (FIGS. 4-6). In other embodiments, a clamp insulation system can extend over one segment of the clamp, over all or portions of one or more adjacent segments, over more or less than half of the clamp.

The above described clamp insulation systems can also include a relief structure to facilitate securing the foil cover to the band. For example, the relief structure can include wedge-shaped cutouts 431 (see, e.g., FIG. 4) to facilitate crimping of the foil cover over a large portion of the clamp and to facilitate flexing of the insulation system when the clamp is adjusted (e.g., tightened or loosened). The cutouts can be offset from or arranged to coincide with gaps between segments of the clamp. The clamp 400 is illustrated with offset cutouts 431.

Figure 11:
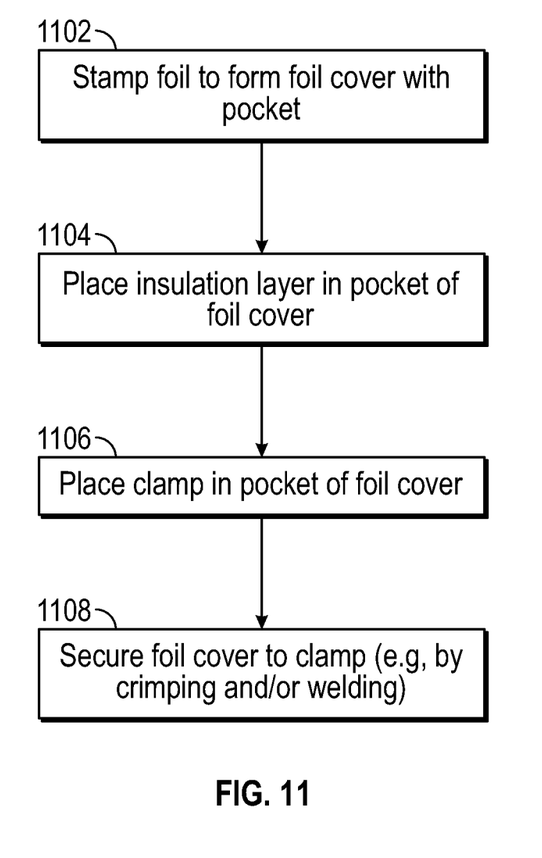
FIG. 11 shows a flow diagram of a method of insulating a clamp according to an embodiment of the invention.

FIG. 11 is a flow diagram illustrating a method of forming in insulating system and of insulating a clamp. At block 1102, a foil is stamped to form a foil cover having a top surface with an optional support structure, two sides and two ends and a pocket between the two sides, top surface and two ends. The ends can be tapered and extend beyond the top surface by about 1-2 inches on each side. The tapered ends facilitate securing the insulation system to the clamp.

At block 1104, an insulation layer is placed within the pocket. The insulation layer typically has a width about the same as the width of the foil cover top surface so that it can lie between the foil cover side walls. At block 1106, a clamp is placed in the pocket formed by the foil. With a V-band clamp and other clamps, this can include placing at least a portion of a band of the clamp within the pocket of the foil cover so that the top surface of the band is disposed against the insulating layer.

At block 1106, the foil cover is secured to the band of the clamp. The securing can include wrapping the sides of the foil cover around the side surfaces of the band and crimping the sides of the foil cover to the band. The tapered ends of the foil cover can be pressed against the top surface of the band with sides of the ends being wrapped around and crimped to the band and the ends welded to the top surface of the band to provide a seal. Crimping allows for efficiently assembly of the system and allows the system to flex with the clamp. However, it should be appreciated that other ways to secure the sides of the foil cover to the clamp can be used, such as welding.

NOTES AND EXAMPLES

The following, non-limiting examples, detail certain aspects of the present subject matter to solve the challenges and provide the benefits discussed herein, among others.

Example 1 is a clamp and insulation system, comprising: a clamp having a band with a top surface; and an insulation system comprising: an insulation layer disposed over at least a portion of the top surface of the clamp band; and a foil cover covering the insulation layer and having an arcuate shape conforming to a shape of the clamp band, the foil cover defining a pocket holding the insulation layer and including side walls extending over the insulation layer and crimped around the clamp band.

In Example 2, the subject matter of Example 1 optionally includes wherein the clamp includes a retainer beneath the clamp band, the retainer have a first segment and a second segment, the first segment and second segment being separated by a gap; and wherein the insulation system is disposed over a portion of the first segment and a portion of the second segment and over the gap.

In Example 3, the subject matter of Example 2 optionally includes wherein the insulation system is disposed over less than half of the clamp band.

In Example 4, the subject matter of any one or more of Examples 1-3 optionally include wherein the insulation system extends substantially around an entire circumference of the band.

In Example 5, the subject matter of any one or more of Examples 1-4 optionally include wherein the insulation layer has a thickness of ¼ inch to 1 inch and the foil cover is made from stainless steel having a thickness of 0.003 inches to 0.010 inches.

In Example 6, the subject matter of Example 5 optionally include wherein the insulation layer thickness is about ¼ inch and the foil cover thickness is about 0.008 inches.

In Example 7, the subject matter of any one or more of Examples 1-6 optionally include wherein the foil cover includes a top surface having an integrally-formed support rib centered between the side walls of the foil cover.

In Example 8, the subject matter of Example 7 optionally includes wherein the foil cover includes tapered end walls secured against a top surface of the clamp band, wherein the rib extends over the end walls.

In Example 9, the subject matter of Example 8 optionally includes wherein edges of the end walls are crimped around the band and the end walls are welded to the top surface of the band.

Example 10 is a clamp and insulation system, comprising: a V-band clamp including a band that has a top surface, bottom surface, side surfaces and a width defined between the side surfaces; an insulation layer having a width of about the width of the band, the insulation layer being disposed directly on a portion of the band of the clamp; and a stainless steel foil cover covering the insulation layer, the foil cover having sides extending over the insulation layer, around the side surfaces of the band, and secured to an inner surface of the band of the clamp, the foil cover including ends extending circumferentially beyond the insulation layer along an outer surface of the band, the ends having sides crimped around the side surfaces of the band and to the bottom surface of the band, the foil cover including support structure on a top portion of the foil cover between foil cover sides.

In Example 11, the subject matter of Example 10 optionally includes wherein the clamp includes a first segment and a second segment, the first segment and second segment being separated by a gap, and the insulation layer and foil cover are disposed over a portion of the first segment and a portion of the second segment and over the gap.

In Example 12, the subject matter of any one or more of Examples 10-11 optionally include wherein the insulation layer and foil cover extend substantially around an entire circumference of the band of the clamp.

In Example 13, the subject matter of any one or more of Examples 10-12 optionally include wherein an insulation layer thickness is about ¼ inch and a foil cover thickness is about 0.008 inches.

Example 14 is a method of insulating a clamp, comprising: stamping a foil to form a foil cover having a top surface with a support structure, two sides and two ends and forming a pocket between the two sides, top surface and two ends; placing an insulation layer within the pocket, the insulation layer having a width about the same as a width of the foil cover between the foil cover sides; and placing at least a band of a clamp within the pocket of the foil cover, the band having a top surface, a bottom surface and two side surfaces, wherein placing includes disposing the top surface of the band against the insulating layer; and securing foil cover to the band of the clamp, where securing includes wrapping the sides of the foil cover around the side surfaces of the band to the bottom surface and securing the sides of the foil cover to the band.

In Example 15, the subject matter of Example 14 optionally includes wherein securing the foil cover to the band of the clamp includes pressing the ends of the foil cover against the top surface of the band, wrapping portions of the side surfaces at the ends of the foil cover around the side surfaces of the band, and crimping the side surfaces of the foil cover to the band.

In Example 16, the subject matter of Example 15 optionally includes wherein securing the foil cover further includes crimping the ends of the foil cover around the band of the clamp and welding the ends to the side surface of the band of the clamp.

Example 17 is a clamp insulation system, comprising: a foil cover having a top surface with a support structure, two sidewalls and two ends, the foil cover defining a pocket between the top surface and side walls; and an insulation layer disposed in the pocket between the sidewalls and adjacent an inside of the top surface of the foil cover; and wherein the side walls have a depth so that the pocket is capable of receiving a band of a clamp and the side walls are capable of being crimped about the band of the clamp.

In Example 18, the subject matter of Example 17 optionally includes wherein the insulation layer has a thickness of ¼ inch to 1 inch and the foil cover is made from stainless steel having a thickness of 0.003 inches to 0.010 inches.

In Example 19, the subject matter of Example 18 optionally includes wherein the insulation layer thickness is about ¼ inch and the foil cover thickness is about 0.008 inches.

In Example 20, the subject matter of any one or more of Examples 17-19 optionally include wherein the foil cover support structure is an integrally-formed rib centered between the sides of the foil cover.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A clamp and insulation system, comprising:
a clamp having a band with a top surface; and
an insulation system comprising:
an insulation layer disposed over at least a portion of the top surface of the clamp band; and
a foil cover covering the insulation layer and having an arcuate shape conforming to a shape of the clamp band, the foil cover configured to hold the insulation layer and including side walls extending over the insulation layer and crimped around the clamp band;
wherein the foil cover includes a top surface having an integrally-formed support rib centered between the side walls of the foil cover;
wherein the foil cover includes tapered end walls secured against a top surface of the clamp band, wherein the rib extends over the end walls; and
wherein edges of the end walls are crimped around the band and the end walls are welded to the top surface of the band.

2. The system of claim 1, wherein the clamp includes a retainer beneath the clamp band, the retainer have a first segment and a second segment, the first segment and second segment being separated by a gap; and wherein the insulation system is disposed over a portion of the first segment and a portion of the second segment and over the gap.

3. The system of claim 2, wherein the insulation system is disposed over less than half of the clamp band.

4. The system of claim 1, wherein the insulation layer has a thickness of ¼ inch to 1 inch and the foil cover is made from stainless steel having a thickness of 0.003 inches to 0.010 inches.

5. The system of claim 4, where in the insulation layer thickness is about ¼ inch and the foil cover thickness is about 0.008 inches.

6. A clamp and insulation system, comprising:
a V-band clamp including a band that has a top surface, bottom surface, side surfaces and a width defined between the side surfaces;
an insulation layer having a width of about the width of the band, the insulation layer being disposed directly on a portion of the band of the clamp; and
a stainless steel foil cover covering the insulation layer, the foil cover having sides extending over the insulation layer, around the side surfaces of the band, and secured to an inner surface of the band of the clamp, the foil cover including ends extending circumferentially beyond the insulation layer along an outer surface of the band, the ends having sides crimped around the side surfaces of the band and to the bottom surface of the band, the foil cover including support structure on a top portion of the foil cover between foil cover sides.

7. The system of claim 6, wherein the clamp includes a first segment and a second segment, the first segment and second segment being separated by a gap, and the insulation layer and foil cover are disposed over a portion of the first segment and a portion of the second segment and over the gap.

8. The system of claim 6, wherein the insulation layer and foil cover extend substantially around an entire circumference of the band of the clamp.

9. The system of claim 6, wherein an insulation layer thickness is about ¼ inch and a foil cover thickness is about 0.008 inches.

10. The system of claim 6, wherein the support structure is an integrally-formed support rib centered between the sides of the foil cover.

11. The system of claim 10, wherein the foil cover includes tapered end walls secured against a top surface of the clamp band, wherein the rib extends over the end walls.

12. The system of claim 11, wherein edges of the end walls are crimped around the band and the end walls are welded to the top surface of the band.

* * * * *